(12) United States Patent
Garza et al.

(10) Patent No.: US 8,694,340 B2
(45) Date of Patent: Apr. 8, 2014

(54) SYSTEMS AND METHODS TO EVALUATE APPLICATION DATA

(75) Inventors: Erika Garza, San Antonio, TX (US); Troy Avon Brocker, San Antonio, TX (US); Mark Ginther, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 13/401,479

(22) Filed: Feb. 21, 2012

(65) Prior Publication Data

US 2012/0221359 A1 Aug. 30, 2012

Related U.S. Application Data

(60) Provisional application No. 61/445,075, filed on Feb. 22, 2011.

(51) Int. Cl.
*G06Q 40/00* (2012.01)

(52) U.S. Cl.
USPC .................................................. 705/4; 705/35

(58) Field of Classification Search
USPC ....................................................... 705/4, 35
See application file for complete search history.

(56) References Cited

U.S. PATENT DOCUMENTS

| | | | |
|---|---|---|---|
| 7,813,944 B1 * | 10/2010 | Luk et al. .......................... | 705/4 |
| 7,818,186 B2 * | 10/2010 | Bonissone et al. ................. | 705/4 |
| 7,945,497 B2 * | 5/2011 | Kenefick et al. ................. | 705/35 |
| 8,005,693 B2 * | 8/2011 | Bonissone et al. ................. | 705/4 |
| 8,145,507 B2 * | 3/2012 | Zizzamia et al. .................. | 705/4 |
| 8,200,511 B2 * | 6/2012 | Zizzamia et al. .................. | 705/4 |
| 2003/0187698 A1 * | 10/2003 | Bonissone et al. ................ | 705/4 |
| 2003/0187703 A1 * | 10/2003 | Bonissone et al. ................ | 705/4 |
| 2008/0154651 A1 * | 6/2008 | Kenefick et al. .................. | 705/4 |
| 2011/0066454 A1 * | 3/2011 | Rosauer et al. ................... | 705/4 |
| 2011/0161119 A1 * | 6/2011 | Collins ............................. | 705/4 |
| 2011/0184766 A1 * | 7/2011 | Virdhagriswaran .............. | 705/4 |
| 2011/0218827 A1 * | 9/2011 | Kenefick et al. .................. | 705/4 |
| 2012/0072247 A1 * | 3/2012 | Rosauer et al. ................... | 705/4 |
| 2012/0166228 A1 * | 6/2012 | Singleton et al. ................. | 705/4 |
| 2012/0271659 A1 * | 10/2012 | Zizzamia et al. .................. | 705/4 |
| 2012/0296676 A1 * | 11/2012 | Burgoon et al. .................. | 705/4 |

* cited by examiner

*Primary Examiner* — Sara C Hamilton
(74) *Attorney, Agent, or Firm* — Edwards Wildman Palmer LLP

(57) ABSTRACT

The present disclosure introduces systems and methods to evaluate application data. A computer system to evaluate application data is described. In one embodiment, a data module may be used to receive application data and validate the application data against at least one secondary data source. A predictive modeling module may be used to model the application data by applying predictive analytics. Further, a confidence level module may be used to calculate a confidence level factor and at least one aggregate degree of confidence level to evaluate an application. Other embodiments are also described.

8 Claims, 5 Drawing Sheets

SYSTEMS AND METHODS TO EVALUATE APPLICATION DATA

CROSS-REFERENCE TO RELATED APPLICATIONS

The present application claims priority of U.S. Provisional Patent Application Ser. No. 61/445,075, filed on Feb. 22, 2011, the content of which is herein incorporated by reference.

BACKGROUND

1. Field of Invention

The present disclosure relates generally to systems and methods to evaluate application data, and more particularly to a predictive analysis process and system.

2. Description of the Related Art

There are many variables to consider when it comes to issuing insurance policies. Rate integrity can fluctuate greatly with all the different variables to evaluate. A one-size-fits-all approach may force insurance policyholders to pay much greater premiums than necessary to obtain coverage. Inaccuracies in policy information can also result in additional costs to both the insured and the insurer. Evaluating the risks associated with insuring an applicant and modeling data associated with that applicant can help an insurer obtain a more accurate representation of its customers.

SUMMARY

The present disclosure introduces systems and methods to evaluate application data. A computer system to evaluate application data is described. In one embodiment, a data module may be used to receive application data and validate the application data against at least one secondary data source. A predictive modeling module may be used to model the application data by applying predictive analytics. Further, a confidence level module may be used to calculate a confidence level factor and at least one aggregate degree of confidence level to evaluate an application. Other embodiments are also described.

This summary is provided to introduce a selection of concepts in a simplified form that are further described below in the detailed description. This summary is not intended to identify key features or essential features of the claimed subject matter, nor is it intended to be used to limit the scope of the claimed subject matter.

An illustrative aspect of the invention relates to a computer-implemented method for processing and evaluating application data for an insurance policy in a remote computer processing system. The method including the steps of receiving application data relating to an insurance policy and validating the application data against at least one secondary data source. A predictive is determined by applying predictive analytics preferably using a plurality of variables to determine the predictive and a confidence level is determined for each of the plurality of variables. Contingent upon the predictive, an insurance policy is issued if the aggregate confidence level is within a predetermined threshold, and if the aggregate confidence level is not within a predetermined threshold, issuance of the issuance policy is denied.

BRIEF DESCRIPTION OF THE DRAWINGS

Various embodiments will now be described in detail with reference to the accompanying drawings.

DETAILED DESCRIPTION

The present invention is now described more fully with reference to the accompanying drawings, which illustrate various embodiments of the present invention. The present invention is not limited to any of these illustrated embodiments since they are provided as merely exemplary embodiments of the subject disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The following detailed description is divided into several sections as follows: an exemplary hardware and operating environment, a system overview, and methods of exemplary embodiments.

Exemplary Hardware and Operating Environment

This section provides an overview of one example of hardware and an operating environment in conjunction with which embodiments of the present disclosure may be implemented. It is to be appreciated the embodiments of this disclosure, as discussed below, are preferably a software algorithm, program or code residing on computer usable medium having control logic for enabling execution on a machine having a computer processor. The machine typically includes memory storage configured to provide output from execution of the computer algorithm or program.

Figure 1:
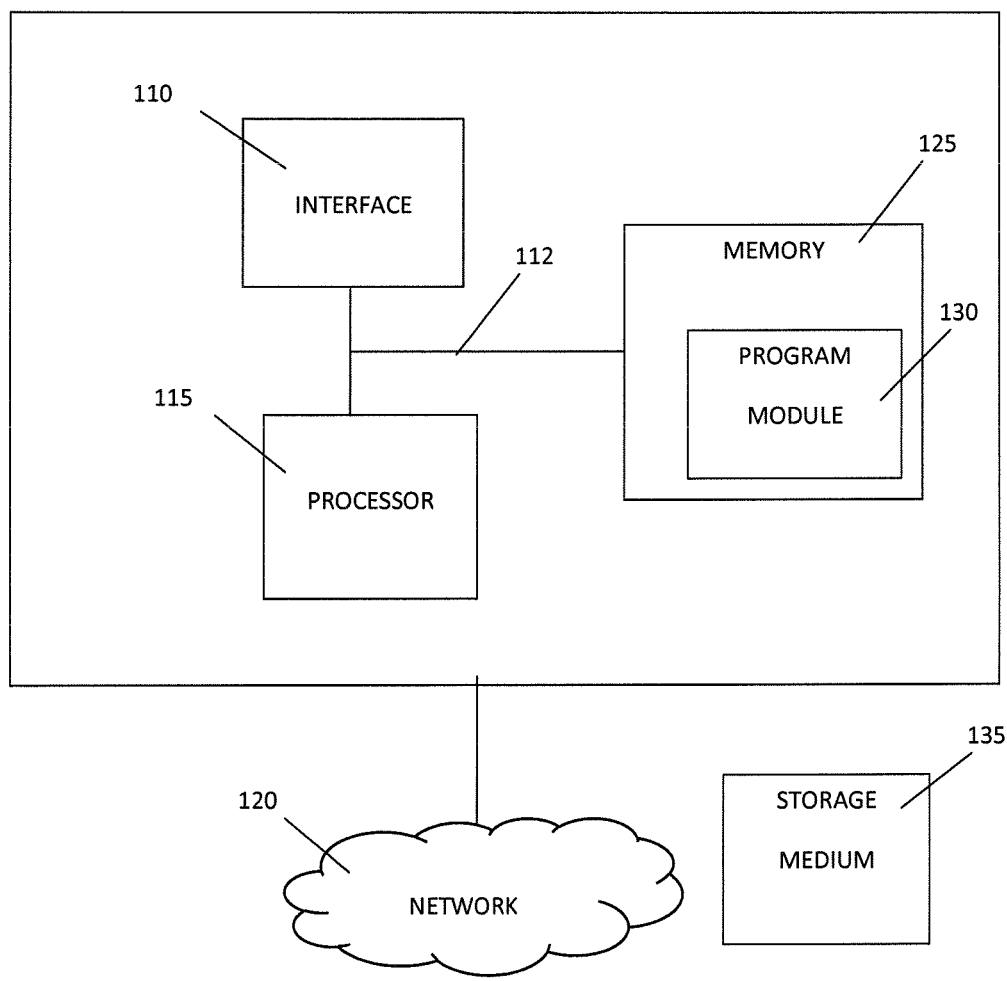
FIG. 1 depicts an exemplary computer system that may be used with illustrative embodiments of the present invention.

Turning now descriptively to the drawings, in which similar reference characters denote similar elements throughout the several views, FIG. 1 depicts an exemplary general-purpose computing system in which illustrated embodiments of the present invention may be implemented.

FIG. 1 depicts an exemplary computer system, i.e., system 100, which may be used with an illustrative embodiment of the present invention. System 100 generally includes at least one processor 115, or processing unit or plurality of processors, at least one interface 110, e.g., a user-interface, and a memory 125 coupled together via a bus or group of buses 112. Although system 100 is represented herein as a standalone device, it is not limited to such, but instead can be coupled to other devices (not shown) in a distributed processing system.

Interface 110 includes an input device, such as a keyboard or speech recognition subsystem, for enabling a user to communicate information and command selections to processor 115. Interface 110 also includes an output device such as a display. A cursor control such as a mouse, track-ball, or joy stick, allows the user to manipulate a cursor on the display for communicating additional information and command selections to processor 115. Interface 110 is also provided for coupling the processing system 100 to one or more peripheral devices. Input to interface 110 can be derived from multiple sources, for example keyboard instructions in conjunction with data received via a network 120. Output from interface 110 produces or generates output data and can comprise, for example, a display device or monitor in which case output data is visual, a printer in which case output data is printed, a port for example a USB port, a peripheral component adaptor, a data transmitter or antenna such as a modem or wireless network adaptor, etc. Output data can also be distinct and derived from different output devices, for example a visual display on a monitor in conjunction with data transmitted to network 120. A user could view data output, or an interpretation of the data output, on, for example, a monitor or using a printer.

Processor 115 is an electronic device configured of logic circuitry that responds to and executes instructions. The processor 115 could comprise more than one distinct processing device, for example to handle different functions within the processing system 100. Processor 115 outputs, to user interface 110, a result of an execution of the methods described herein. Alternatively, processor 115 could direct the output to a remote device (not shown) via network 120.

Memory 125 is a computer-readable medium encoded with a computer program. In this regard, memory 125 stores data and instructions that are readable and executable by processor 115 for controlling the operation of processor 115. Memory 125 may be implemented in a random access memory (RAM), volatile or non-volatile memory, solid state storage devices, magnetic devices, a hard drive, a read only memory (ROM), or a combination thereof. One of the components of memory 125 is a program module 130.

Program module 130 contains instructions for controlling processor 115 to execute the methods described herein. Examples of these methods are explained in further detail in the subsequent of exemplary embodiments section-below. The term "module" is used herein to denote a functional operation that may be embodied either as a stand-alone component or as an integrated configuration of a plurality of subordinate components. Thus, program module 130 may be implemented as a single module or as a plurality of modules that operate in cooperation with one another. Moreover, although program module 130 is described herein as being installed in memory 125, and therefore being implemented in software, it could be implemented in any of hardware (e.g., electronic circuitry), firmware, software, or a combination thereof.

In use, system 100 is adapted to allow data or information to be stored in and/or retrieved from, via wired or wireless communication, at least one database (not shown). Processor interface 110 can provide wired and/or wireless communication the processor 115 and peripheral components that may serve a specialized purpose. Preferably, processor 115, under the control of instructions from program module 130, receives input data via network 120 or interface 110. Processor 115 further processes this input data to yield resultant processed data. Processor 115 further provides the processed data as output data to interface 110 or to network 120 for further transmission. It should be appreciated that the processing system 100 may be any form of terminal, server, specialized hardware, or the like.

It is to be further appreciated that network 120 depicted in FIG. 1 can include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device such as storage medium 135. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present disclosure may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld (e.g., smart phones, tablet devices, etc.) or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, this disclosure is not to be limited by what has been particularly shown and described, except as indicated by the appended claims.

System Level Overview

Figure 2:
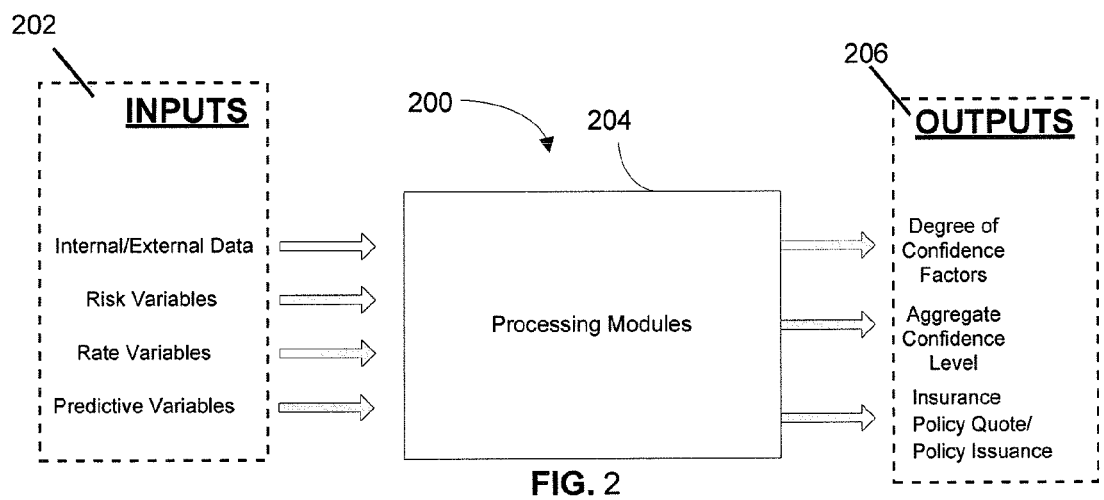
FIG. 2 is a block diagram illustrating a general overview of an application evaluation system, according to an example embodiment.

FIG. 2 comprises a block diagram illustrating a general overview of an application evaluation system 200 according to an example embodiment. Generally, the application evaluation system 200 may be used to obtain and evaluate application data. It is to be appreciated, in the below illustrative description, the application evaluation system 200 is used to evaluate application data regarding issuance, and rate determinations, for an issuance policy. It is to be appreciated the invention is not to be understood to be limited to such an illustrative embodiment as it may be adapted and for configured for many applications having application data/information, such as, for example, an application for a line of credit for either secured or unsecured assets.

In this exemplary implementation, the application evaluation system 200 comprises inputs 202, computer program processing modules 204, and outputs 206. In one embodiment, the application evaluation system 200 may be a computer system such as shown in FIG. 1, discussed-above. Inputs 202 are received by processing modules 202 and processed into outputs 206. Inputs 202 may include internal/external data, risk variables, rate variables, and predictive variables. Inputs 202 may also include policy account information. A plurality of each type of variable may be inputted into the application evaluation system 200.

A first input 202 may be internal/external data. Internal/external data may be any data captured, received, transmitted, or processed during the application evaluation process. Internal data may be any information useful to the decision making process found within an organization conducting an application review. Internal/external data may be used to authenticate customer application data. Internal data may include customer supplied information, loss information, and driving experience information. In an example embodiment, internal data may be data collected by an organization such as operating or customer data. An example of an organization that may utilize internal data includes, but is not limited to, an insurance provider, or an organization that provides a line of credit for secured and unsecured credit. An insurance provider may receive application data pertaining to a customer seeking to become insured. Internal data may also include historical data, which the organization maintains pertaining to an existing or potential customer. In one embodiment, internal data in the form of historical data may have been accumulated by the organization from past dealings or transactions with the customer.

External data may be any information obtained by an organization through a third-party data source. External data may be collected by a third party and received by an organization. Examples of external data may include but are not limited to third-party data, public records, prior insurance records, and internet resources and accessible sources, among others. In one embodiment, an organization may purchase proprietary information from a third-party source to improve the application evaluation process within its organization.

Internal/external data may be obtained by a variety of communication channels. Communication channels may include, but are not limited to, internet, networks, mobile devices, phones, satellites, and in-person consultation, among others. However the internal/external data may be captured, it will be transformed by the processing modules 204 to create outputs 206.

Another input 202 may be risk variables. Risk variables may be attributes that identify the potential risk for an insured exposure to incur future loss or profitability. Risk variables can be any information used to evaluate the short-term risk of insuring a customer as well as the long-term risk of insuring that same customer. In one embodiment, risk variables may be used to verify application data provided to an organization. Specific examples of risk variables can be found in the "Example Implementations" section of this specification.

Yet another input 202 may be rate variables. Rate variables may be any considerations that can affect the rate charged by an organization to a customer. Rate variables may be attributes that provide for accurate pricing of an exposure to be insured. Rate variables may dovetail with risk variables. One example of this may be the location/address of a customer. If the customer is located in a high crime area, there is a greater risk that harm can be caused to person/property and a higher rate may likely be charged to insure the customer. Specific examples of rate variables can be found in the "Example Implementations" section of this specification.

Another input 202 may include predictive variables. Predictive variables may be analytical attributes that can be used to display the potential for future loss or profitability of a potential customer. Predictive variables may aim to address the long-term insurability of a customer. Predictive variables may coincide with both risk and rate variables. One example of an attribute that may be considered all three types is the military status of a customer. Specific examples of predictive variables can be found in the "Example Implementations" section of this specification.

Processing modules 204 generally include routines, computer programs, objects, components, data structures, etc., that perform particular functions or implement particular abstract data types. The processing modules 204 receive inputs 202 and apply the inputs 202 to capture and process application data producing outputs 206. The processing module may evaluate both internal and external outputs 206 to determine possible interactions within individual data values. The processing modules 204 are described in more detail by reference to FIG. 3.

The outputs 206 may include degree of confidence factors to evaluate the variables of an application, an aggregate confidence level to evaluate an application in its entirety, and an insurance policy quote/policy issuance. In one embodiment, inputs 202 are received by processing modules 204 and applied to application data to create confidence in and authenticate application data and the variables which may affect insuring a customer and issuing that customer an insurance policy. The outputs 206 measure confidence of prediction output based on reliability of data. The outputs 206 may include a weighted score of individual data elements based on input source credibility and relevance.

One output 206 may be degree of confidence factors. Degree of confidence factors may be used to verify the accuracy of application data as well as to indicate the reliability of an estimate of each input variable. In one embodiment, degree of confidence factors may be used to validate the accuracy of application data obtained by an organization. Application data obtained by an organization may be modeled and potential conflicts may be identified and investigated. The output 206 may be used to suggest a value or a range of values for an individual variable indicating what the expected value of the variable.

In another embodiment, degree of confidence factors may be used to estimate the reliability of input variables. A degree of confidence factor may be created for each individual variable used to evaluate an application. In one embodiment, certain input variables may be determined to be more critical than others to accurately evaluate an application. An organization may consider some variables more important than others. The organization may make a determination on which variables are deemed to be important to evaluating an application. For example, variables such as mileage driven on a daily basis as well as driving record may be more relevant when evaluating an automobile insurance policy than a homeowner's policy. In different applications, different variables may be assigned greater weight or deference. The output 206 may include a weighted score of individual data elements based on source credibility and relevance.

A second output 206 may be an aggregate confidence level used to evaluate an application in its entirety. The aggregate confidence level may be a combination of the evaluation of a majority or all input variables. In one embodiment, a single aggregate confidence level may be created. In another embodiment, multiple aggregate confidence levels may be produced. For instance, an aggregate confidence level may be created for all risk variables, rate variables, or predictive variables associated with the evaluation of an application. Both the degree of confidence factors and the aggregate confidence level may be calculated by applying statistical analysis to the input data 202. Statistical analysis may involve evaluation of degrees of variance between application and transaction data elements and predictive outputs to determine whether a conflict exists and create an individual variable and an aggregate score.

Yet another output 206 may be insurance policy quote/policy issuance. The insurance policy quote/policy issuance may be directly related to the degree of confidence factors and the aggregate confidence level determined by modeling and processing the inputs 202. In one embodiment, a threshold value may be determined and compared to the confidence assessments and applied business rules to make a determination if an insurance policy will be issued to a customer. This assessment may also provide a rate quote that may be provided to a customer showing the cost associated with obtaining an insurance policy. In another embodiment, the processed input data and applied business rules may also be used to reevaluate the rate and policy of an existing insurance policy. The combination of the confidence, conflict assessment, and business rules will determine the decision outputs: accept, refer, decline, modify, or validate.

For illustration, consider an applicant named "Bob." In the process of applying for insurance, Bob provides his name, social security number, and date of birth. It is understood that an applicant may be a person who already has insurance. Thus, the term "applicant" may refer to an insured person looking to apply for new or different insurance (e.g., a renewal or replacement policy), or an uninsured person looking to apply for new insurance (e.g., a new policy). Each of these pieces of data may be used as inputs representing risk, e.g., risk variables. For example, Bob's name and date of birth may be verified for accuracy using third-party data. If an inconsistency is found, the risk of insuring Bob is presumed to be higher, unless some reasonable explanation is provided. Similarly, Bob's social security number may be validated and used to assess risk. In addition, Bob's social security number and date of birth may be used to calculate rate, e.g., rate variables. Bob's date of birth may be used to determine age, which may have an effect on Bob's rate. Additionally, Bob's social security number may be used to obtain a criminal background check and determine whether Bob has any criminal history. Bob's criminal history may be useful as a predictive variable. For example, the type of offenses, timing between offensive, and age of the most recent offense, may be useful to determine whether Bob is creditworthy.

If any of Bob's information is considered inaccurate or untrustworthy, Bob may be denied coverage. Alternatively, a customer service representative may contact Bob to discuss the unconfirmed information and ask for proof or additional information. The action taken in response to Bob entering information may be conditional upon the confidence level of the inaccuracy. For example, depending on the source of third-party data, the confidence in such data may vary. Thus, when Bob's date of birth is validated against third-party data, the confidence in the data may affect the resulting action if Bob's date of birth is questionable. If the confidence in the third-party data is high, then Bob may be denied coverage under the belief that Bob is attempting to defraud the insurance company. However, if the confidence in the third-party data is low, Bob may be contacted to verify his date of birth or correct the information he submitted.

Figure 3:
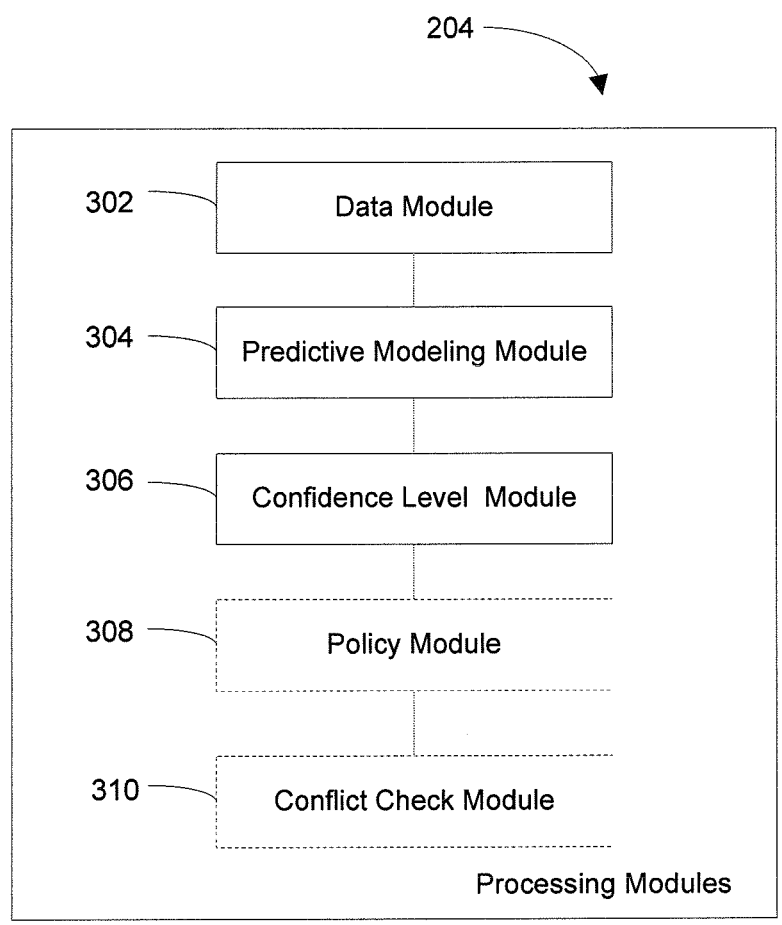
FIG. 3 is a block diagram illustrating the processing modules of the system shown in FIG. 2, according to an example embodiment.

FIG. 3 is a block diagram of the processing modules 204 of the system 200 shown in FIG. 2, according to various embodiments. Processing modules 204, for example, comprise a data module 302, a predictive modeling module 304, and a confidence level module 306. Alternative embodiments are also described below.

The first module, a data module 302, may be used to receive application data and validate the application data against at least one secondary data source. Application data may be received from a variety of different communication channels, such as the communication channels noted in the description of FIG. 2. In one embodiment, common communication channels to receive application data include internet/email, mobile device, phone, and in-person consultation. Application data may be entered by a customer and received by an organization. Alternatively, application data may be obtained by an organization. In one embodiment, an organization may be an insurance provider entering application data on behalf of the customer.

Once the application data is received, the data module 302 may also be used to validate the application data by comparing it to at least one secondary data source. A secondary data source may be any source of data other than the customer or applicant who submitted the original application data. The secondary data source may be used to both validate the application data entered on behalf of a customer as well as provides additional information to supplement the application process. In one embodiment, the secondary data source may be historical data about the customer/applicant provided by an organization. An organization such as an insurance provider may have historical data such as insurance records or history on file. In an alternative embodiment, a secondary data source may be third-party data. Third-party data may be any information obtained that is not provided by the organization receiving the application data. In an example embodiment, an organization such as an insurance provider may purchase data from a third-party source.

The second module, a predictive modeling module 304, may be used to model the application data. The predictive modeling module 304 may apply predictive analytics to analyze the application data and data acquired from the at least one secondary source. Additionally, the predictive modeling module 304 may use a plurality of variables to further model the application data and data acquired from the at least one secondary source. Predictive analytics may be used to extract information from both the application data and secondary source data, and use that data to predict future trends and behavior patterns. The predictive analytics will measure specific interactions between individual data among all internal and external data inputs. The plurality of variables used by the predictive modeling module 304 should bear a relationship to past data and exploit such data to predict future outcomes. Furthermore, including the plurality of variables in the modeling process may allow an organization to accurately evaluate an application in both the short-term and the long-term. In one embodiment, the plurality of variables may include risk variables, rate variables, and predictive variables, such as those described in the description of FIG. 2. Specific examples of the plurality of variables used by the predictive modeling module 304 can be found in the "Example Implementations" section of this specification.

The third module, a confidence level module 306, may be used to calculate a confidence level factor for each of the plurality of variables. Additionally, the confidence level module 306 may create at least one aggregate degree of confidence level to evaluate an application. Confidence level factors may be used to estimate the reliability of the plurality of variables modeled by the predictive modeling module 304. A confidence level factor may be created for each individual variable used to evaluate an application.

Moreover, the confidence level module 306 may be used to create at least one aggregate degree of confidence to evaluate an application. The aggregate degree of confidence may comprise a combination of the confidence level factors created for the plurality of variables. Additionally, the aggregate degree of confidence may take into account the application data and data obtained from secondary data sources to provide a more accurate evaluation of the application. In one embodiment, a single aggregate confidence level may be created. In another embodiment, multiple aggregate confidence levels may be produced. In an example embodiment, an organization such as an insurance provider will utilize both the degree of confidence factors and the aggregate confidence level to evaluate an insurance application, gaining both short-term and long-term perspectives.

In an example embodiment, the confidence level module 306 may further include weighting certain individual variables from the plurality of variables to improve the accuracy of the aggregate degree of confidence level determination. As described in the description of FIG. 2, an organization may consider some variables more important than other variables. The organization may make a determination on which variables are deemed interesting when evaluating an application. In an example embodiment, the confidence level module 306 may further be used to determine a threshold confidence level to issue an insurance policy.

In an alternative embodiment, an additional processing module, namely, a policy module 308 may be used to provide rate quotes and issue insurance policies. Additionally, the policy module 308 may also be used to re-evaluate existing insurance policies using the other processing modules 204 described.

In another alternative embodiment, yet another processing module, namely a conflict check module 310 may be used to flag conflicts in the application data. Conflicts will be determined based on the degree of variance between application and transaction data and the predictive level outputs. Moreover, the conflict check module 310 may be used by an organization to determine follow-up measures to address detected conflicts in the application data.

Exemplary Methods

In this section, particular methods to evaluate application data and example embodiments are described by reference to a series of flow charts. The methods to be performed may constitute computer programs made up of computer-executable instructions.

Figure 4:
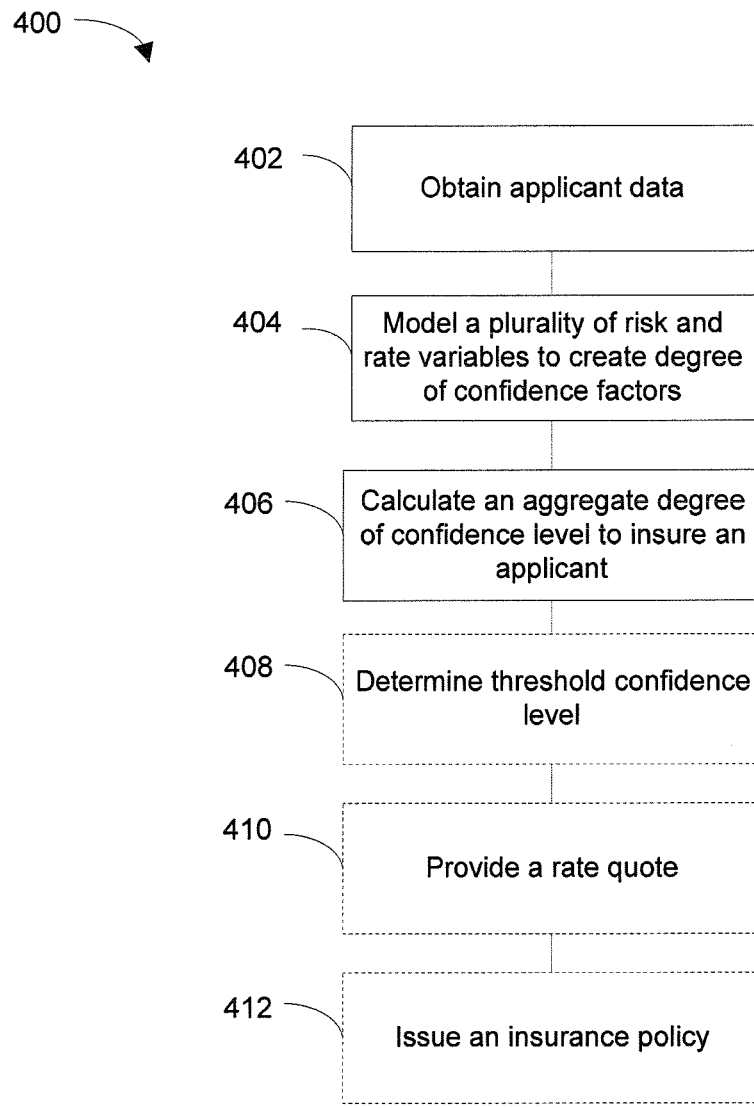
FIG. 4 is a block diagram illustrating a method to evaluate an insurance application, according to an example embodiment.

FIG. 4 is a block diagram illustrating a method 400 to evaluate an insurance application, according to an example embodiment. The method 400 represents one embodiment of an application evaluation system such as the application evaluation system 200 described in FIGS. 1 and 2 respectively. The method 400 may be implemented by obtaining applicant data (block 402), modeling a plurality of risk and rate variables to create degree of confidence factors (block 404), and calculating at least one aggregate degree of confidence level to insure an applicant (block 406).

Applicant data is obtained at block 402. As discussed above, with respect to FIG. 2, applicant data can be internal/external which is includes any data captured received, transmitted or processed during the application evaluation process. It is also understood that an applicant may be a person who already has insurance. Thus, the term "applicant" may refer to an insured person looking to apply for new or different insurance (e.g., a renewal or replacement policy), or an uninsured person looking to apply for new insurance (e.g., a new policy). Applicant data may be received from a variety of different communication channels, such as the communication channels noted in the description of FIG. 2. Applicant data may be entered by a customer and received by an organization. Alternatively, applicant data may be obtained by an organization. In one embodiment, an organization may be an insurance provider entering applicant data on behalf of the customer.

A plurality of risk and rate variables is modeled at block 404 to create degree of confidence factors. Modeling may include comparing the applicant data to at least one data set in order to create a degree of confidence factor for each of the plurality of risk and rate variables. Modeling may further include applying predictive analytics that incorporate the applicant data and at least one data set. In one embodiment, predictive analytics may be performed on a computer device having a processor so that statistical analysis can be applied.

A data set may be any collection of information that may be pertinent to evaluating an insurance application. The data set may be obtained from a variety of different communication channels, such as the communication channels noted in the description of FIG. 2. In one embodiment, a data set may be manipulated by a computer. In an example embodiment, a data set may be historical data specific to the applicant. In another example embodiment, a data set may be third-party data. Block 404 may further include flagging conflicts in the application data when compared to the at least one data set.

The risk and rate variables used at block 404 may be associated with the applicant data obtained at block 402. Specific examples of the plurality of risk and rate variables modeled can be found in the "Example Implementations" section of this specification. Confidence level factors may be used to estimate the reliability of the plurality of risk and rate variables modeled. A confidence level factor may be created for each individual variable used to evaluate an application.

At least one aggregate degree of confidence level is calculated at block 406. The aggregate degree of confidence level may comprise a combination of the confidence level factors created for the plurality of risk and rate variables. Additionally, the aggregate degree of confidence level may take into account the applicant data and data obtained from at least one data set to provide a more accurate evaluation of the application. In one embodiment, a single aggregate degree of confidence level may be created. In another embodiment, multiple aggregate degrees of confidence levels may be produced. In an example embodiment, block 406 may further include determining which individual risk and rate variables are most critical to insuring the applicant. In another example embodiment, block 406 may further include weighting the determined most critical risk and rate variables in the calculation of the aggregate degree of confidence level.

An alternative embodiment of FIG. 4 may further include determining a threshold confidence level needed to issue an insurance policy for the applicant (block 408). The threshold confidence level may be compared to the confidence level factors and the at least one aggregate degree of confidence level to evaluate whether an application should be issued. Another alternative embodiment to FIG. 4 may further include providing a rate quote to insure the applicant (block 310). Additionally, yet another alternative embodiment of FIG. 4 may include issuing an insurance policy on behalf of an applicant (block 412).

Figure 5:
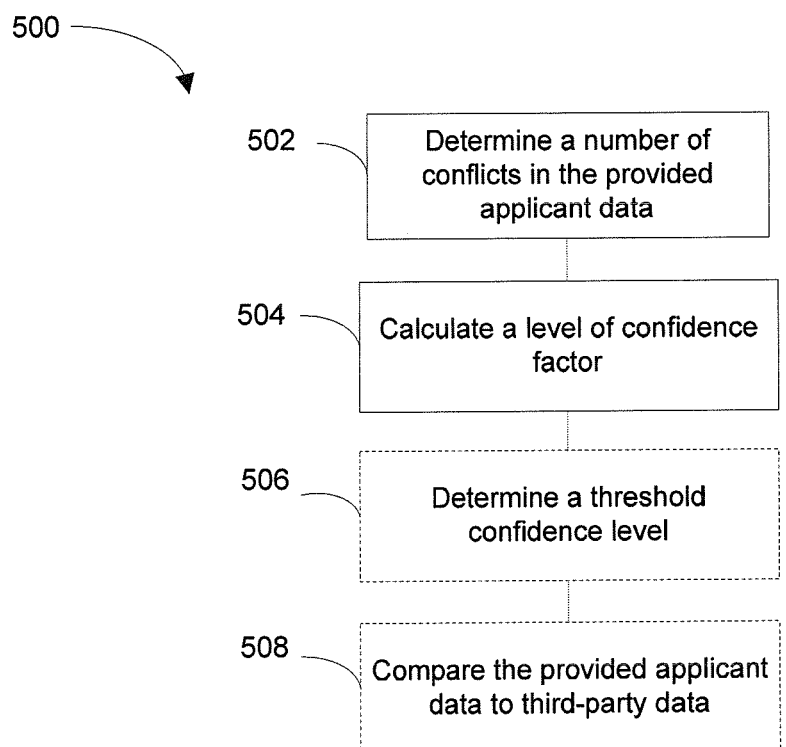
FIG. 5 is a block diagram illustrating a method to assess an application, according to an example embodiment.

FIG. 5 is a block diagram illustrating a method 500 to assess an application. The method 500 represents one embodiment of an application evaluation system such as the application evaluation system 200 described in FIGS. 1 and 2, respectively. The method 500 may be implemented by determining a number of conflicts in the provided applicant data (block 502), and calculating at least one level of confidence factor (block 504).

A number of conflicts in the provided applicant data are determined at block 502. Conflicts in the provided applicant data may be determined by comparing the provided applicant data to the historical data. Provided applicant data refers to applicant data as previously described throughout this description. Historical data may be any information pertaining to an existing or potential customer/applicant. In one embodiment, historical data may have been accumulated by the organization from past dealings or transactions with the customer. Conflicts identified in the provided applicant data may be flagged for review.

At least one level of confidence factor for the accuracy of the provided applicant data is calculated at block 504. The level of confidence factor is created by applying predictive analytics to the provided applicant data and the historical data about the applicant. In one embodiment, multiple levels of confidence factors may be calculated to increase the accuracy of the evaluation of the provided applicant data.

An alternative embodiment to FIG. 5 may further include determining a threshold confidence level needed to issue an insurance policy (block 506). The threshold confidence level may be compared to the at least one level of confidence factor to evaluate an application. In one embodiment, the threshold confidence level of block 506 may be determined by an organization such as an insurance provider.

Another alternative embodiment to FIG. 5 may include comparing the provided applicant data to third-party data (block 508). This may occur after determining the number of conflicts in the provided applicant data (block 502). Third-party data may be any information obtained that is not provided by the organization receiving the provided applicant data. In an example embodiment, an organization such as an insurance provider may purchase data from a third-party source. If third-party data is used to validate the accuracy of the provided applicant data, block 504 may further comprise utilizing the third-party data in the predictive analytics analysis to improve the accuracy of the at least one level of confidence factor.

Exemplary Implementations

Various examples of computer systems and methods for embodiments of the present disclosure have been described above. Listed and explained below are alternative embodiments, which may be utilized by the application evaluation system. Specifically, a listing of a plurality of variables that may be used to evaluate application data is provided. The listing below enumerates a number of risk, rate, and predictive variables. It should be noted that this listing is intended to provide examples of potential variables that may be used. It is not intended to be an exhaustive list of all potential variables that may be applied to evaluate application data.

Potential Risk Variables can include, but are not limited to: Names; Social Security Number ("SSN"); Date of Birth ("DOB"); Military Status; Criminal Convictions; Business or Commercial Address; Title History of Vehicle; Indicators of Prior Damage; Validation of Commercial or Business Use; Vehicle Registration; and Capture of All Licensed Drivers in a Household.

Potential Rate Variables can include, but are not limited to: SSN; DOB; Military Status; Location of Employment; Loss History; Violation History; Insurance Score; Credit Score; Homeownership; Home Policy Currently in Force; Vehicle Garage Location; Base Address Validation; Business or Commercial Address; Title History of Vehicle; Validation of Commercial or Business Usage; Current Coverage Verification; Prior Coverage Limits; List of All Vehicles Owned By Household Licensed Operators; Capture of All Licensed Drivers in a Household; Ability to Parse Out Apartment and Multiple-Dwelling Unit Hits; and Validation of Annual Mileage Driven Potential Predictive Variables can include, but are not limited to: Military Status; Loss History; Violation History; Insurance Score; Homeownership; Business or Commercial Address; Title History of Vehicle; Indicators of Prior Damage; Validation of Commercial or Business Usage; Current Coverage Verification; Prior Coverage Limits; Insuring Company; Capture of All Licensed Vehicle Operators in a Household; and Validation of Annual Mileage This has been a detailed description of some exemplary embodiments of the present disclosure contained within the disclosed subject matter. The detailed description refers to the accompanying drawings that form a part hereof and which show by way of illustration, but not of limitation, some specific embodiments of the present disclosure, including a preferred embodiment. These embodiments are described in sufficient detail to enable those of ordinary skill in the art to understand and implement the present disclosure. Other embodiments may be utilized and changes may be made without departing from the scope of the present disclosure. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purposes of streamlining the disclosure. This method of disclosure is not to be interpreted as reflecting an intention that the claimed embodiments require more features than are expressly recited in each claim. Rather, as the following claims reflect, the present disclosure lies in less than all features of a single disclosed embodiment. Thus, the following claims are hereby incorporated into the Detailed Description, with each claim standing on its own as a separate preferred embodiment. It will be readily understood to those skilled in the art that various other changes in the details, material, and arrangements of the parts and method stages which have been described and illustrated in order to explain the nature of this disclosure may be made without departing from the principles and scope as expressed in the subjoined claims.

What is claimed is:

1. A computer system for processing and evaluating application data for insurance, comprising:
  a memory configured to store instructions;
  a processor disposed in communication with said memory, wherein said processor upon execution of the instructions is configured to:
    receive application data for an insurance policy regarding an applicant said application data including a plurality of variables and wherein the plurality of variables comprises individual risk and rate variables;
    determine which of the risk and rate variables are most relevant to the insurance policy;
    assign greater weight to the risk and rate variables most relevant to the insurance policy;
    validate the application data against data from at least a secondary data source;
    apply predicative analytics wherein said processor configured to apply predictive analytics includes said processor being further configured to: analyze the application data and the data from said at least a secondary data source, modeling the application data and the data from said at least a secondary data source using the plurality of variables, and extract information from both the application data and the data from the at least a secondary data source to predict future trends and behavior patterns;
    determine a degree of confidence factor for each of the plurality of variables used by the model, wherein the degree of confidence factors estimates the reliability of the plurality of variables used by the model;
    calculate an aggregate confidence level by aggregating the degree of confidence factor for each of the plurality of variables, wherein the processor configured to calculate an aggregate confidence level includes the processor being further configured to:
      weigh the degree of confidence factors for the risk and rate variables in accordance with the greater weight assigned to the risk and rate variables most relevant to the insurance policy;
    issue an insurance policy to the applicant when the aggregate confidence level is within a predetermined threshold for the aggregate confidence level; and
    indicate that an insurance policy will not issue to the applicant when the aggregate confidence level is outside the predetermined threshold for the aggregate confidence level.

2. A non-transitory computer readable medium comprising instructions, said instructions when executed by a computer, cause the computer to perform a method for processing and evaluating application data for insurance, the method comprising:
  receiving application data for an insurance policy regarding an applicant said application data including a plurality of variables and wherein the plurality of variables comprises individual risk and rate variables;
  determining which of the risk and rate variables are most relevant to the insurance policy;
  assigning greater weight to the risk and rate variables most relevant to the insurance policy;
  validating the application data against data from at least a secondary data source;
  applying predicative analytics by: analyzing the application data and the data from said at least a secondary data source, modeling the application data and the data from said at least a secondary data source using the plurality of variables, and extracting information from both the application data and the data from the at least a secondary data source to predict future trends and behavior patterns;
  determining a degree of confidence factor for each of the plurality of variables used by the model, wherein the degree of confidence factors estimates the reliability of the plurality of variables used by the model;
  calculating an aggregate confidence level by aggregating the degree of confidence factor for each of the plurality of variables wherein said step of calculating an aggregate confidence level further comprises:
    weighing the degree of confidence factors for the risk and rate variables in accordance with the greater weight assigned to the risk and rate variables most relevant to the insurance policy;
  issuing an insurance policy to the applicant when the aggregate confidence level is within a predetermined threshold for the aggregate confidence level; and
  indicating that an insurance policy will not issue to the applicant when the aggregate confidence level is outside the predetermined threshold for the aggregate confidence level.

3. A computer-implemented method for processing and evaluating application data for insurance, the method comprising the steps of:
  receiving, by a computer processor, application data for an insurance policy regarding an applicant said application data including a plurality of variables and wherein the plurality of variables comprises individual risk and rate variables;
  determining which of the risk and rate variables are most relevant to the insurance policy;
  assigning greater weight to the risk and rate variables most relevant to the insurance policy;

validating, by the computer processor, the application data against data from at least a secondary data source;

applying, by the computer processor, predicative analytics by: analyzing the application data and the data from said at least a secondary data source, modeling the application data and the data from said at least a secondary data source using the plurality of variables, and extracting information from both the application data and the data from the at least a secondary data source to predict future trends and behavior patterns;

determining, by the computer processor, a degree of confidence factor for each of the plurality of variables used by the model wherein the degree of confidence factors estimates the reliability of the plurality of variables used by the model;

calculating, by the computer processor, an aggregate confidence level by aggregating the degree of confidence factor for each of the plurality of variables, wherein said step of calculating an aggregate confidence level further comprises:

weighting the degree of confidence factors for the risk and rate variables in accordance with the greater weight assigned to the risk and rate variables most relevant to the insurance policy;

issuing, by the computer processor, an insurance policy to the applicant when the aggregate confidence level is within a predetermined threshold for the aggregate confidence level; and indicating, by the computer processor, that an insurance policy will not issue to the applicant when the aggregate confidence level is outside the predetermined threshold for the aggregate confidence level.

4. The method of claim 3, further comprising providing to the applicant a rate quote for the insurance policy.

5. The method of claim 4, further comprising prior to said step of providing to the applicant a rate quote for the insurance policy, determining the threshold for the aggregate confidence level needed to issue the insurance policy to the applicant.

6. The method of claim 3, wherein said step of modeling the application data and the data from said at least one secondary data source using the plurality of variables further comprises: flagging conflicts in the application data when compared to the data from the at least a secondary data source.

7. The method of claim 3, wherein the data from the at least a secondary data source is historical data specific to the applicant.

8. The method of claim 3, wherein the data from the at least a secondary data source is third-party data.

* * * * *